United States Patent
Gazdik et al.

(10) Patent No.: US 7,111,279 B2
(45) Date of Patent: Sep. 19, 2006

(54) INTERCEPTING CALLS TO COMMON DIALOG FUNCTIONS

(75) Inventors: Charles J. Gazdik, Boise, ID (US); Shell Sterling Simpson, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 686 days.

(21) Appl. No.: 10/283,495

(22) Filed: Oct. 30, 2002

(65) Prior Publication Data
US 2004/0088683 A1    May 6, 2004

(51) Int. Cl.
G06F 9/44    (2006.01)
G06F 3/00    (2006.01)

(52) U.S. Cl. .................. 717/110; 719/328; 719/332

(58) Field of Classification Search .......... 717/106, 717/110, 130–138; 719/328, 331, 332
See application file for complete search history.

(56) References Cited

U.S. PATENT DOCUMENTS 6,199,202 B1 * 3/2001 Coutant et al. ............. 717/138
6,268,924 B1 * 7/2001 Koppolu et al. ............ 358/1.13
6,779,187 B1 * 8/2004 Hammond ................... 719/331
2002/0019887 A1 * 2/2002 Moore ......................... 709/328
2004/0243975 A1 * 12/2004 Kreuger et al. ............. 717/106

* cited by examiner

Primary Examiner—Tuan Dam
Assistant Examiner—Isaac T. Tecklu

(57) ABSTRACT

Accordingly, embodiments of the present invention operate to intercept a call directed to a common dialog function and to redirect that call to another more desirable proxy function. An action module providing an internal function that makes a call to the external function is loaded into memory. The action module's import address table is accessed. The external function is identified within the import address table, and an address associated with the external function is replaced with an address to be used to access the proxy function. In one embodiment, the proxy function is designed to utilize settings acquired programmatically and is able to replace a common dialog function, thus, eliminating the need for user interaction to perform a particular task.

11 Claims, 8 Drawing Sheets

| IAT | | | |
|---|---|---|---|
| module | function | address | |
| ONE | | | |
| | PrintDlg | () | |
| TWO | | | |
| | GetOpenFile | () | |

INTERCEPTING CALLS TO COMMON DIALOG FUNCTIONS

CROSS REFERENCE TO RELATED APPLICATION

This is a continuation-in-part of the patent application 10/283,695, filed on Oct. 30, 2002 entitled, "Intercepting Function Calls."

FIELD OF THE INVENTION

The present invention generally relates to altering the behavior of a computer program, and, more specifically, to intercepting calls directed to a common dialog function and redirecting those calls to a more desirable proxy function.

BACKGROUND

In today's computing environments, applications rely on operating systems to function. Operating systems provide a software platform on top of which applications can run. Operating systems perform basic tasks, such as recognizing input from a keyboard and mouse, sending output to a display screen, keeping track of files and directories on a hard disk drive, and controlling peripheral devices such as printers. Modern operating systems take a modular approach to supporting various applications. For example, a given operating system may make available a number of functions—those functions residing in a series of programming modules. However, a given application may only need a few of those functions. Consequently, programming for all of the functions provided by the operating system need not be loaded into a computer's memory—only the programming for those functions used by the application.

When an application is executed and loaded into a computer's memory, the operating system identifies and also loads into memory each of the operating system's modules that supply functions needed by the application. Such a module might include a common dialog function for presenting an interface enabling a user to select options for tasks such as opening a file, printing, and page setup. For these purposes, Microsoft Windows® supplies the functions GetOpenFileName, PrintDlg, and PageSetupDlg. All applications compatible with the operating system can call on one or all of these functions. Beneficially, the user need only become familiar with a single interface for completing a particular task regardless of the application being used.

An operating system's common dialog functions require user interaction. For example, a user desiring to print a document using a word processor selects a print icon causing the word processor to call the operating systems common dialog function for printing. The printing common dialog function presents an interface enabling the user to select a printer and other production options such as the number of copies and the page range or ranges to be printed. With the selections made the user closes the interface and the print dialog function returns production data representing the user selections to the word processor. The word processor then directs the selected printer to produce the document accordingly.

Often, however, it is desirable for other programming to provide the necessary interaction needed to utilize a given common dialog function. For example, a user may desire that programming operating on a server print a document. Where the server is geographically separated from the user, the user is not able to provide the interaction needed to direct the programming on the server to print the document. The user must instead rely on other programming operating on the server to supply the needed interaction. Unfortunately, programming designed to mimic human interaction is often cumbersome and unreliable.

This problem reveals a need for a method for intercepting a call to common dialog function and redirecting the call to a module that gathers settings from a programmatic interface and that can return selections normally provided by a user. The same techniques used to achieve this goal can be used for a variety of other purposes such as providing a user with a more specialized interface than those provided by an operating system's common dialog functions.

SUMMARY

Accordingly, embodiments of the present invention operate to intercept a call directed to a common dialog function and to redirect that call to another more desirable proxy function. An action module providing an internal function that makes a call to the external function is loaded into memory. The action module's import address table is accessed. The external function is identified within the import address table, and an address associated with the external function is replaced with an address to be used to access the proxy function. In one embodiment, the proxy function is designed to utilize settings acquired programmatically and is able to replace a common dialog function, thus, eliminating the need for user interaction to perform a particular task.

DETAILED DESCRIPTION

INTRODUCTION: Modern operating systems take a modular approach to supporting various applications. For example, a given operating system may make available a number of functions—those functions residing in a series of programming modules. However, a given application may only need a few of those functions. Consequently, programming for all of the functions provided by the operating system need not be loaded into a computer's memory—only the modules providing functions used by the application.

Operating systems such as Microsoft Windows® supply common dialog functions that provide interfaces enabling a user to make selections needed to perform tasks such as opening a file and printing a document. These common dialog functions are designed to respond to human interaction. Where, for example, an electronic document is sent to a remote server, human interaction is often not an option. Software operating on the server requires a programmatic interface to produce the document. Also, it is often desirable to tailor a user interface to the specific needs of a limited group of users. The common dialog functions supplied by operating systems provide user interfaces broadly designed to meet the needs of the consuming public as a whole. It is expected, then, that various embodiments of the present invention will operate to intercept calls made to an operating system's common dialog function. The intercepted function calls can then be redirected to a module providing functions more suited to a particular user's needs whether that need be for a programmatic interface or an interface tailored to the user's particular needs.

Figure 7:
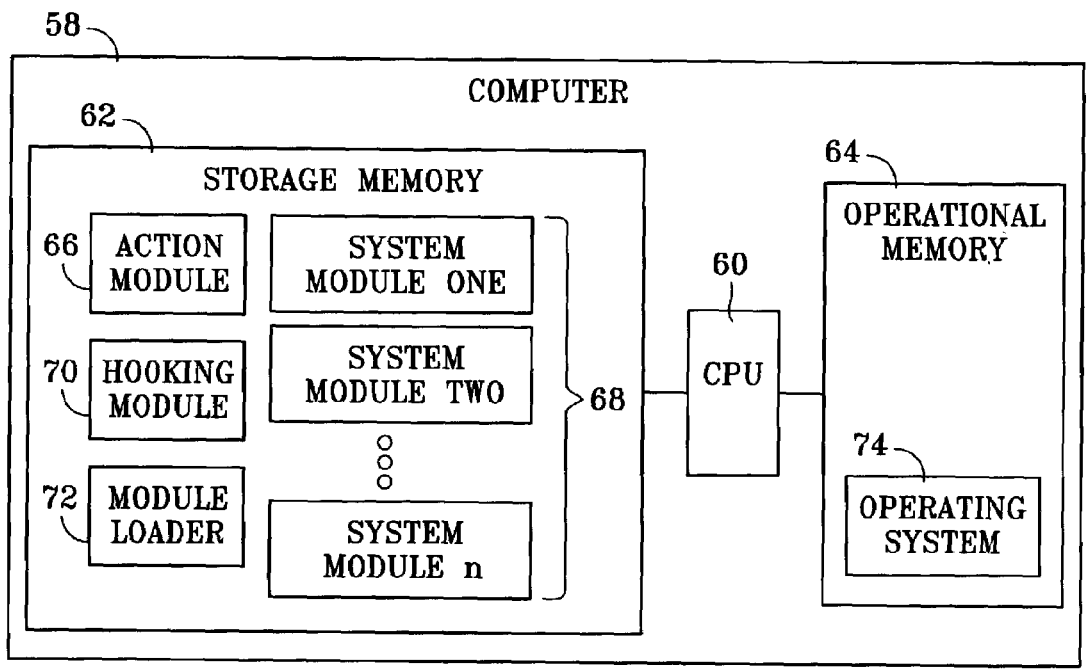
FIG. 7 is a block diagram illustrating a computing environment in which various embodiments of the present invention may be implemented.

In the description that follows, the steps taken to load and utilize a programming module will be described with reference to FIGS. 1–6 The environment in which various embodiments of the present invention may be implemented is described with reference to FIGS. 7 and 8 Steps taken to practice an embodiment of the present invention are then described with reference to FIG. 9. Finally, an example of one particular implementation of an embodiment of the present invention is described with reference to FIGS. 10–15.

Figure 1:
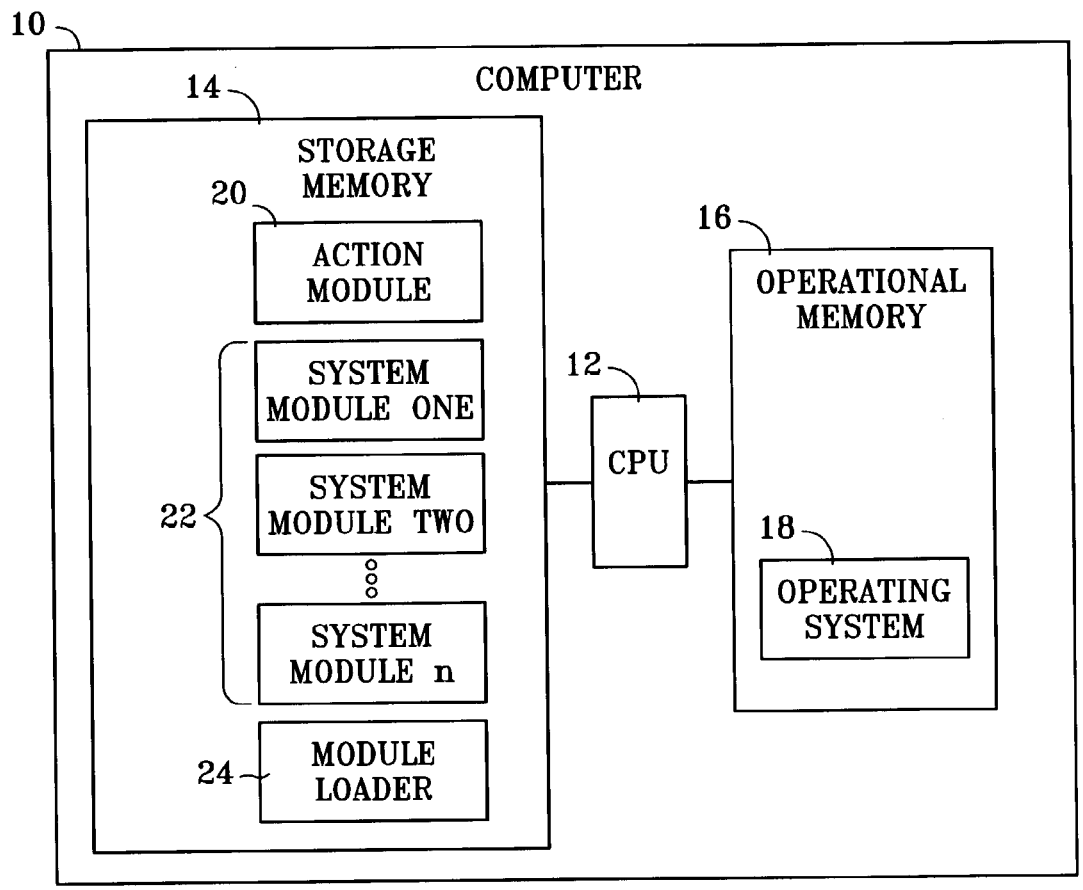
FIG. 1 is a block diagram illustrating the physical and logical components of a computer system.

APPLICATION EXECUTION: FIG. 1 is a block diagram illustrating some physical and logical components of a computer 10. Computer 10 includes CPU 12 (Central Processing Unit), storage memory 14, and operational memory 16. CPU 12 represents generally any processor capable of executing computer programs. Storage represents generally any memory designated to store programs and other data when not being used by CPU 12. Typically, storage memory 14 is non-volatile memory able to retain its contents when computer 10 is switched off. Examples include hard disk drives, flash memory, and floppy disks. Operational memory 16 represents generally any memory designated to contain programs and data when in use by CPU 12. Typically, operational memory 16 is volatile memory which loses its contents when computer 12 is switched off. An example of operational memory 16 is RAM (Random Access Memory).

FIG. 1 illustrates computer 10 with only operating system 18 loaded into operational memory 16. Storage memory 14 contains action module 20, system modules 22, and module loader 24. Action module 22 represents generally any programming providing one or more internal functions. Examples of internal functions include opening or saving a file and printing a document. System modules 22 represent programming modules providing external functions that may or may not be needed by the internal functions provided by action module 20. An example of an external function is a common dialog function. Module loader 24 represents generally any programming capable of loading action module 20 into operation memory 16.

In a Microsoft Windows environment, the file names of action modules have the extension .dll—standing for "dynamic link library." A .dll module is not an executable. In other words, to utilize a .dll module, an executable, in this case module loader 24, must first load the .dll module into operational memory 16. An example of a Microsoft Windows module loader is the file rundll32.exe. An example of a Windows .dll file is the MSHTML.DLL module. One of the functions provided by this module is PrintHTML—programming capable of printing a web page. To use the PrintHTML function, a user or other programming need only pass the name of the web page to the function. The PrintHTML function then makes a call to a common print dialog function, PrintDlgEx in this case, provided by a system module. The PrintDlgEx function provides an interface enabling a user to select a printer and other production options. Once the user makes the selections, the PrintDlgEx function returns production data representing the user's instructions to the MSHTML.DLL module which in turn directs the selected printer to produce the web page accordingly.

Figure 2:
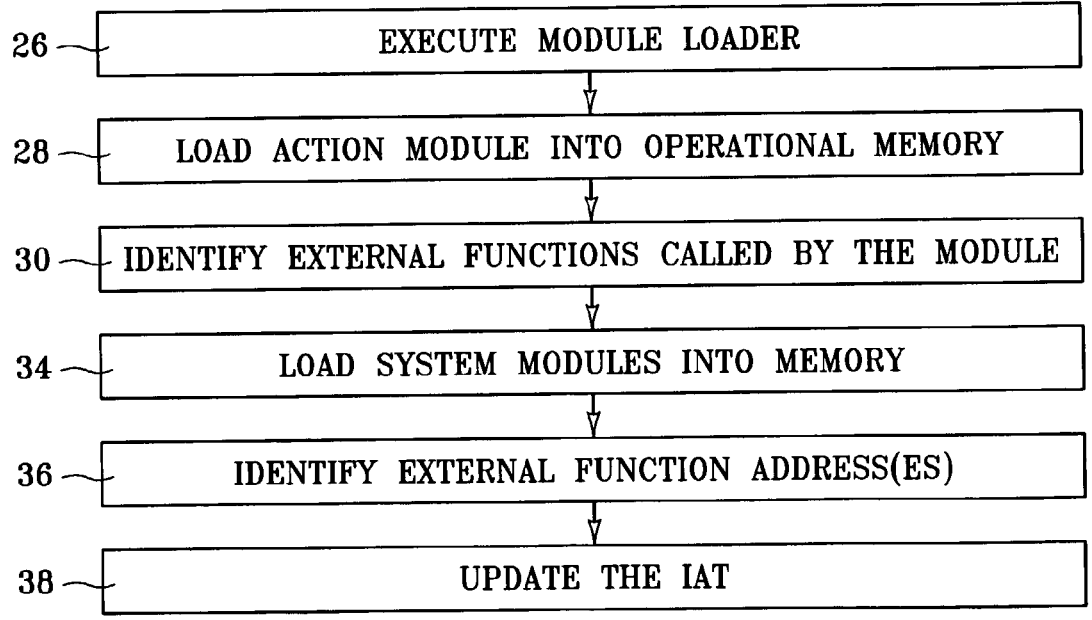
FIG. 2 is flow diagram illustrating steps taken to load an action module into operational memory.
Figures 3, 4:
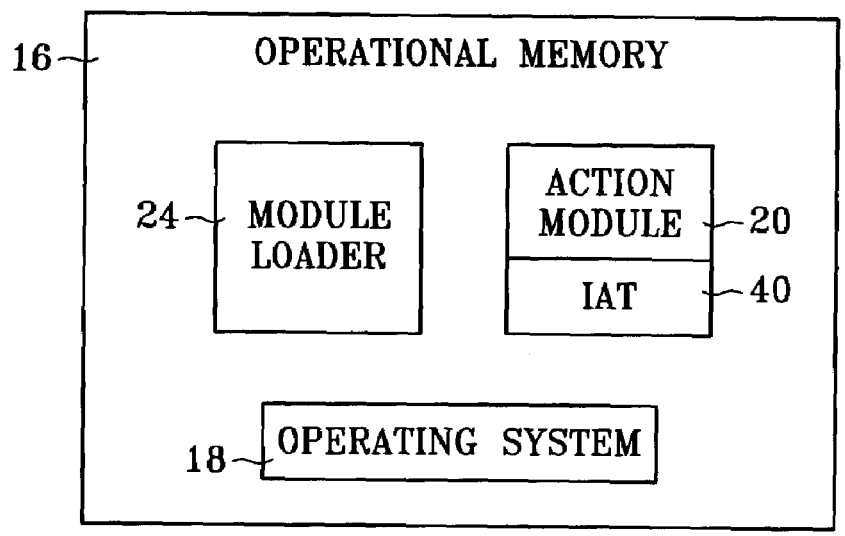
FIGS. 3–6 are block diagrams illustrating the contents of the operational memory of FIG. 1 as the steps described in FIG. 2 are executed.
Figures 5, 6:
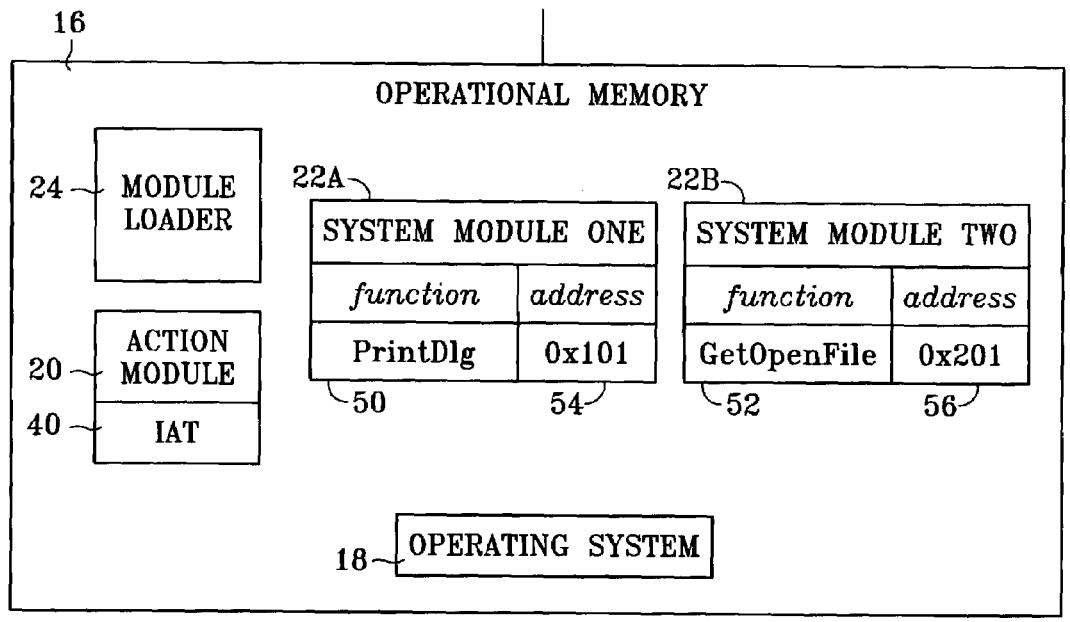

The steps taken to load action module 20 into operational memory 16 using an operating system such as Microsoft Windows® will be described with reference to FIG. 2. FIGS. 3–5 help to illustrate the contents of operational memory as the steps of FIG. 2 are carried out. Upon direction from a user or other programming, operating system 18 accesses storage memory 14 and executes module loader 24 passing data identifying action module 20 (step 26). Module loader 24 loads action module 24 into operational memory 16 (step28). Action module 24 includes an IAT (Import Address Table) The IAT is an array used by action module 24 to identify the memory address of the external functions identified in step 30. The IAT, when functional, associates a unique memory address with a name identifying each external function. However, as no system module 22 has yet been loaded into operational memory 16, the IAT, at this point, contains the names of the identified functions but does not contain addresses. Below, this is illustrated by example with reference to FIGS. 3–5.

Operating system 18 identifies external functions called by action module 24 (step 30). Operating system 18 loads the system module or modules 22 that provide the function or functions identified in step 30 (step 34). Operating system 18 identifies the memory addresses of the external functions identified in step 30 and provided by each of the system modules 22 loaded in step 34 (step 36). Using the identified addresses, operating system 18 updates the IAT rendering the IAT functional (step 38). Calls can now be made to internal functions provided by action module 20. Where an internal function provided by action module 20 makes a call to an external function, the internal function acquires the address for the external function from the IAT.

FIG. 3 illustrates the contents of operational memory 16 following step 32 in which operating system 18 generates the IAT—referenced as IAT 40. Operational memory 16 contains module loader 24, action module 20, and IAT 40. Referring to FIG. 4, IAT 40 includes a series of entries 42—separate entries referencing each external function provided by an system module 22 and called by action module 20. Each entry 42 includes a module field 44, a function field 46, and an address field 48. For each entry 42, the module field 44 contains a name identifying a system module 22, the function field 46 contains a name identifying an external function.

In the example of FIG. 3, the internal functions of action module 20 make calls to external functions provided by system modules one and two. The address fields 48 of entries 42 are empty at this point as system modules one and two have not been loaded. Within module one, one or more of the action module's internal functions make calls to the external function PrintDlg. Within Module two, one or more of the action module's internal functions make calls to the external function GetOpenFile. Modules one and two may provide other functions, but only those listed in IAT 40 are called by action module's internal functions.

FIG. 5 illustrates the contents of operational memory 16 following step 34 in which operating system 18 loads the modules one and two into operational memory 16—the modules are labeled module one 22A and module two 22B. Module one 22A contains programming providing the function labeled PrintDlg 50. Module two 22B contains programming providing the function labeled GetOpenFile 52. Operating system 18 has loaded the programming for each function into memory addresses 54 and 56.

FIG. 6 illustrates IAT 40 following step 38 in which operating system 18 updates IAT 40. IAT 40 now contains addresses for the PrintDlg and GetOpenFile functions. Whenever an internal function provided by action module 20 makes a call to one of the external functions, that internal function or operating system 18 can access IAT 34 to identify the address for the given external function.

ENVIRONMENT: FIG. 7 is a block diagram illustrating computer 58 which provides an environment in which various embodiments of the present invention may be implemented. Computer 58 includes CPU 60, storage memory 62, and operational memory 64. Storage memory 60 contains action module 66, system modules 68, hooking module 70, and module loader 72. CPU 60 represents generally any processor capable of executing programming 66–72. Operational memory 64 includes operating system 74.

Action module 66 represents generally any programming providing one or more internal functions. Examples of internal functions include opening or saving a file and printing a document. System modules 68 represent programming modules providing external functions that may or may not be needed by the internal functions provided by action module 20. An example of an external function is a common dialog function. Hooking module 70 represents generally any programming capable of altering, in a manner described below, the operation of action module 66 after action module 66 has been loaded into operational memory 64. Module loader 72 represents generally any programming capable of loading hooking module 70 into operational memory 64.

Figure 8:
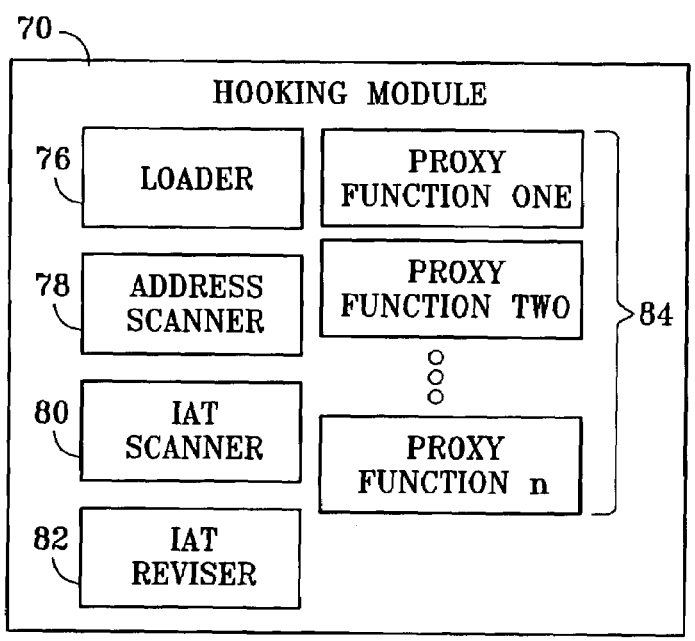
FIG. 8 is a block diagram illustrating the logical programming elements of a hooking module according to one embodiment of the present invention.

FIG. 8 illustrates the logical programming elements of hooking module 70. These include loader 76, address scanner 78, IAT scanner 80, IAT reviser 82 and proxy functions 84. Loader 76 represents generally any programming capable of loading action module 66 into operation memory 64. Address scanner 78 represents generally any programming capable of identifying the memory address of proxy functions 84 once hooking module 70 is loaded in operational memory 64. IAT scanner 80 represents generally any programming capable of identifying a specified external function or functions within an IAT. IAT reviser 82 represents any programming capable of replacing within an IAT an addresses associated with an external address identified by IAT scanner 76 with an address identified by address scanner 78. Proxy functions represent programming designed to replace one or more external functions provided by system modules 68. Where an external function is a common dialog function, a proxy function 84 may obtain settings (normally selected through a user interactive interface) through a programmatic interface. Alternatively that proxy function 84 may provide a user interface more tailored to a particular user's needs.

OPERATION: The steps take to load action and hooking modules 66 and 70 will be described with reference to FIG. 9. Using module loader 72, a user or other programming loads the hooking module 70 into operational memory 64 providing necessary parameters (step 86). Where, for example, hooking module is a Microsoft Windows module, module loader 72 is the executable "rundll32.exe." To complete step 86 the following command may be issued: rundll32.exe ProxyActionModule.dll [paramenter one] [paramenter two] . . . [paramenter n]. "ProxyActionModule.dll" is the file name for hooking module 70. The bracketed parameters are the data sent to hooking module 70 when it is loaded and used by hooking module 70 to perform its intended function.

The loaded hooking module 70 now loads action module 66 into operational memory 64 (step 88). Operating system 74 identifies the external functions called by the internal functions of the loaded action module 66 (step 90). Operating system 74 loads the system modules 68 providing the external functions identified in step 90 (step 94) and updates the IAT to include addresses for the external functions called by the internal functions of action module 66 (step 96).

Hooking module 70 identifies, within the IAT, a common dialog function provided by a system module 68 to which calls from action module 66 are to be intercepted (step 98). As discussed above, hooking module 70 provides proxy functions 84. When hooking module 70 was loaded into operational memory 64 in step 86, each of its proxy functions were assigned a unique memory address. Hooking module's address scanner 78 identifies the address of a proxy function 84 designed to replace the common dialog function identified in step 98 (step 100). Hooking module 70 replaces the address associated with the common dialog function identified in step 98 with the address for the proxy function identified in step 100 (step 102). Finally, the parameters provided in step 86 are passed to the proxy function 84 replacing the common dialog function identified in step 98 (step 104). The term "passed" is being used loosely here. To be more specific, passing may involve storing the parameters provided in step 86 in a rendezvous location accessibly by the proxy function. An example of a rendezvous location would be a temporary file on disk.

Now, calls to the internal functions of action module 66 can be made. Where any one of those internal functions makes a call to the common dialog function identified in step 98, the call, unbeknownst to action module 66, is directed, not to the address for the common dialog function, but to the address for the proxy function 84. Using the parameters "passed" in step 104, the proxy function 104 performs its assignment and if appropriate returns data to the internal function of action module 66 that made the call. To keep the process transparent to action module 66, where proxy function 84 returns data to the internal function of action module 66, it does so in the same manner and format expected from the common dialog function. A more detailed example of this is provided below.

Figure 9:
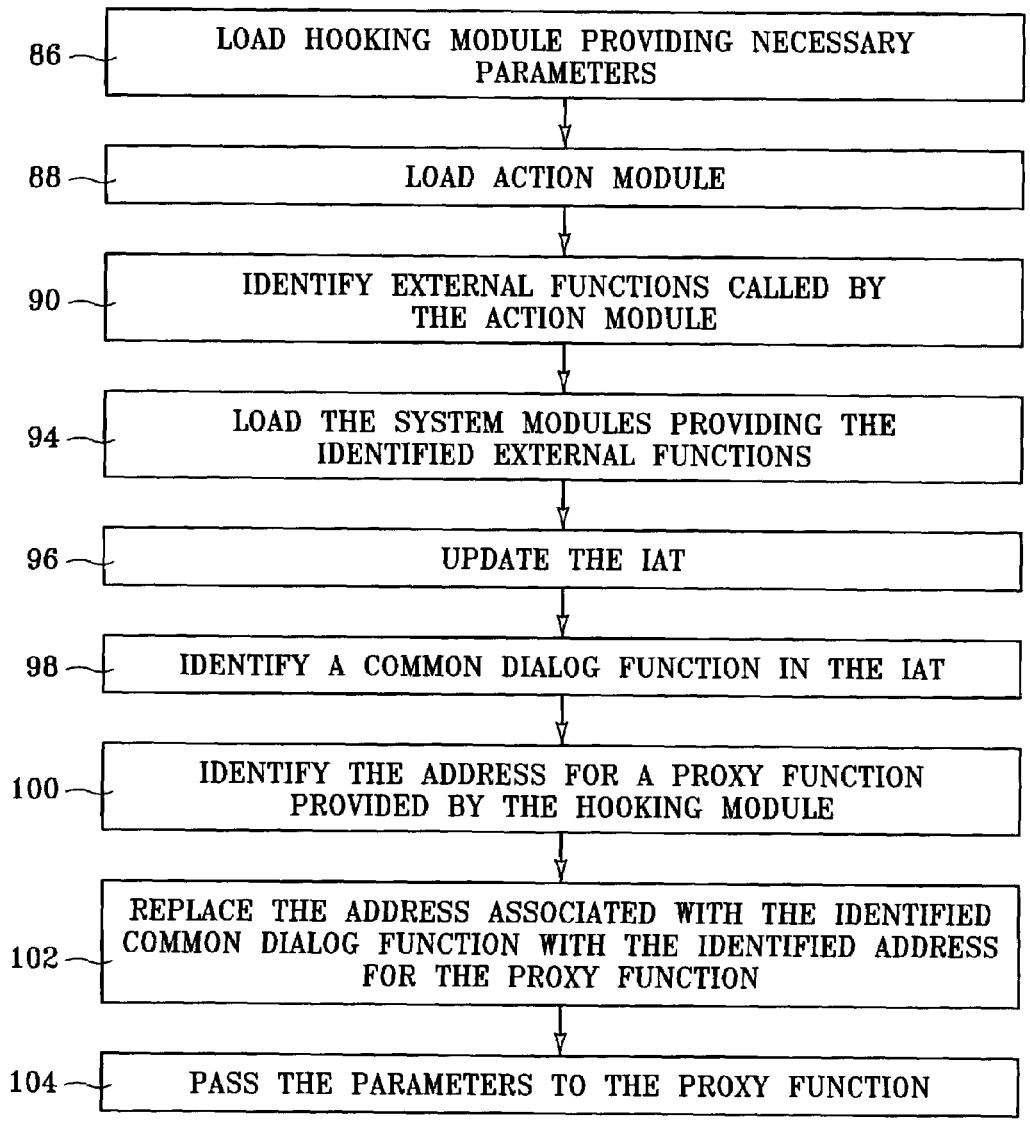
FIG. 9 is a flow diagram illustrating a method in which function calls are intercepted and redirected according to an embodiment of the present invention.

Although the flow chart of FIG. 9 shows a specific order of execution, the order of execution may differ from that which is depicted. For example, the order of execution of two or more blocks may be scrambled relative to the order shown. Also, two or more blocks shown in succession in FIG. 9 may be executed concurrently or with partial concurrence. All such variations are within the scope of the present invention.

Figure 10:
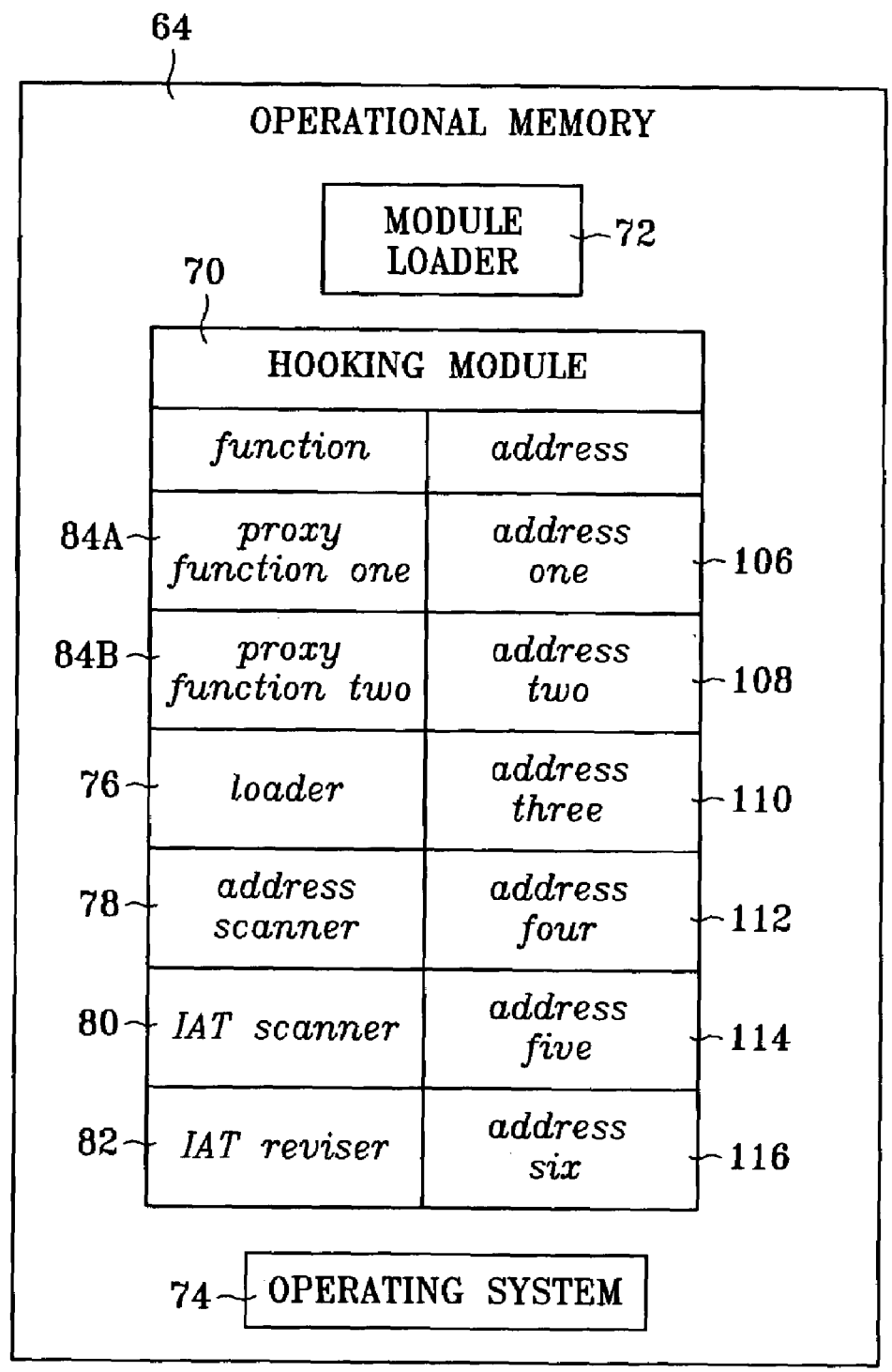
FIGS. 10–15 are block diagrams illustrating the contents of the operational memory of FIG. 8 as the steps described in FIG. 9 are executed according to an embodiment of the present invention.

EXAMPLE: FIGS. 10–15 provide examples that help to illustrate the contents of operational memory 64 as the steps of FIG. 9 are carried out. FIG. 10 illustrates operational memory 64 following step 86. The user or other programming has executed module loader 72 which in turn loaded hooking module 70. Each of the functions 76–84 provided by hooking module 70 have been assigned an address 106–116. While FIG. 10 shows hooking module providing two proxy functions 84, it may provide any number of proxy functions 84.

Figures 11, 12:
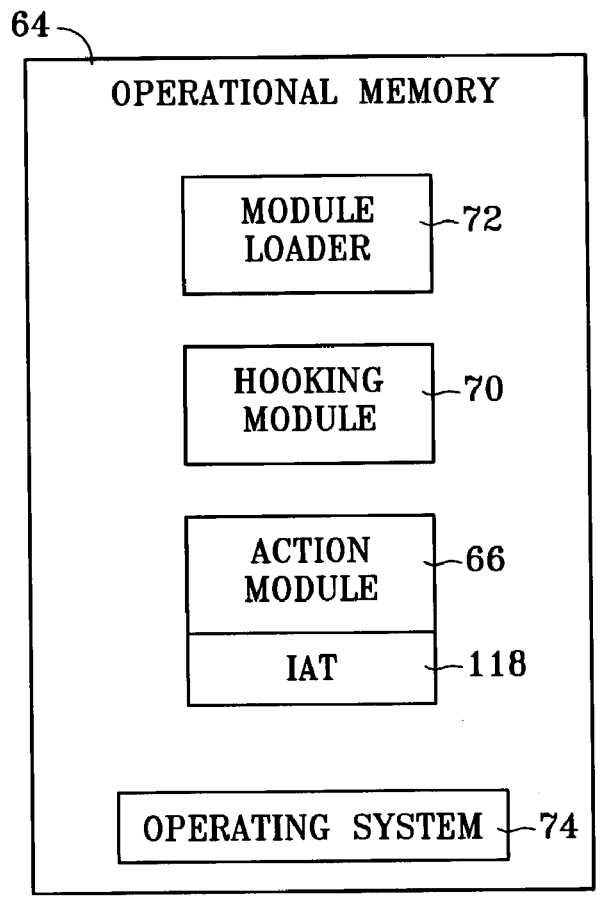

FIG. 11 illustrates operational memory 64 following step 92 after hooking module 70 has loaded action module 66 and its IAT—referenced as IAT 118. FIG. 12 is a table illustrating the logical contents of IAT 118. In this example, internal functions of action module 66 make calls to the external functions common dialog function one 120 provided by system module one 68A and common dialog function two 122 provided by system module two 68B. As system modules 68A and 68B providing these two external functions have not been loaded yet, IAT 118 does not contain addresses. While IAT 118 contains the names of only two external functions 120 and 122, it may contain names for any number of external functions—that number determined by the number of external functions called by action module 66.

Figure 13:
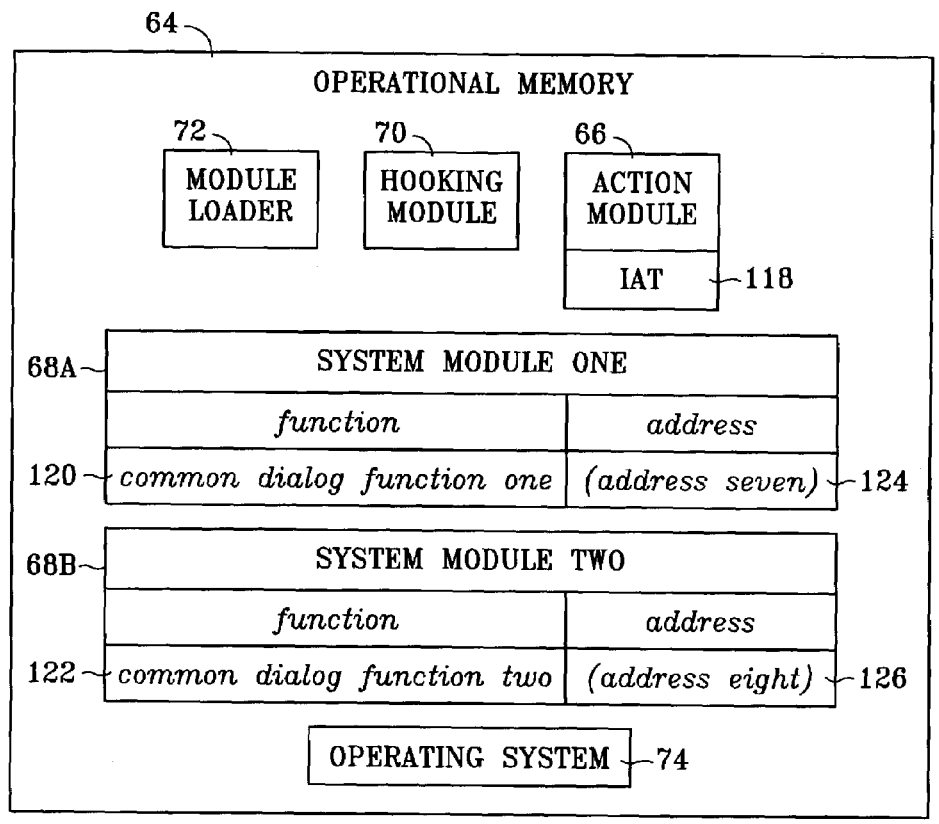
Figure 14:
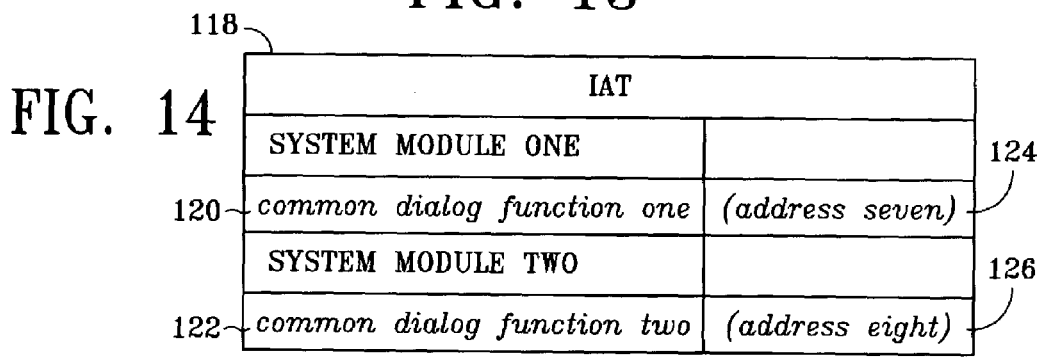
Figure 15:
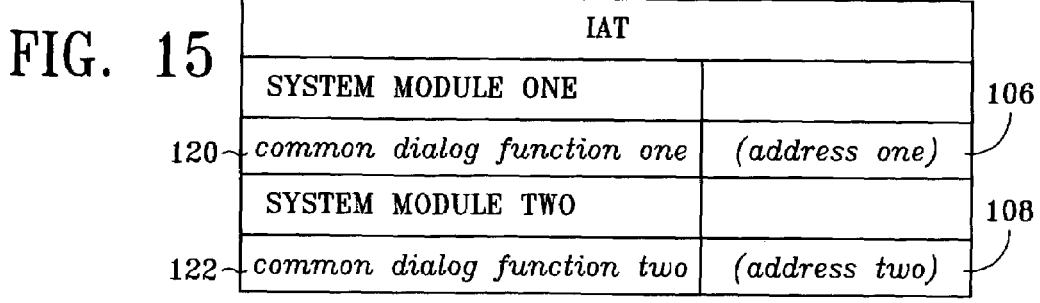

FIG. 13 shows the contents of operational memory following step 94 in which operating system 74 loads the system modules 68A and 68B containing the external functions identified in step 90. Common dialog function 120 has been loaded into address seven 124 while common dialog function 122 has been loaded into address eight 126. FIG. 14 illustrates IAT 118 following step 96. Here, IAT 118 has been updated to include the addresses 122 and 124 for the two external functions 120 and 122. FIG. 15 shows IAT 118 following step 102 in which the addresses 106 and 108 for proxy functions 84A and 84B have replaced addresses 124 and 126.

To illustrate a specific implementation of the present invention, assume that common dialog function one 120 is a common open file dialog function designed to present an interface enabling a user to locate, select, and open a document. Common dialog function two 122 is a common print dialog function designed to provide an interface enabling a user to identify an printer and select miscellaneous production options such as the number of copies or a page range to print. Active module 66 contains internal functions that rely on common dialog functions 120 and 122 to open and print a document.

In this example, active module resides on a server geographically separated from the user who is not able to provide the interaction needed to utilize common dialog functions 120 and 122. Instead of directly loading active module 66, the user remotely directs module loader 72 to load hooking module 70 passing to it parameters including data identifying the document to open, a selected printer, and any production options. Hooking module 70 includes proxy function one 84A designed to replace common dialog function 120 and proxy function two 84B designed to replace common dialog function two 122. Proxy function 84A programmatically returns to action module 66 the data identifying the document to be opened—one of the parameters "passed" to hooking module 70 when it was loaded. Proxy function 84B programmatically returns to return to action module 66 the data identifying the printer and production options—the other parameters "passed" to hooking module 70.

Hooking module 70 loads action module 66. Once IAT 118 for action module 66 has been generated and updated, hooking module 70 replaces within IAT 118 the addresses 124 and 126 for common dialog functions one and two with the addresses 106 and 108 for proxy functions 84A and 84B. Hooking module 70 now makes a call or calls to the internal functions of action module 76.

One of the internal functions makes what it believes to be a call to common dialog function one 120. Due to the revision of IAT 118, that call is directed to proxy function one 84A which returns data identifying the document to be opened. Proxy function one 84A returns this data in the same manner and format that common dialog function one 120 would have. The difference being that no user interface was required.

Another internal function of action module 66 makes a call to what it believes to be common dialog function two 122. Again, due to the revision of IAT 118, that call is redirected to proxy function 84B which returns data identifying the printer and any production options. Proxy function 84B returns this data in the same manner and format that common dialog function 122 would have. The difference again being that no user interface is required.

The data that normally would have been returned by common dialog functions 120 and 122 is instead returned by proxy functions 84A and 84B. This data is "passed" to proxy functions 84A and 84B when hooking module 70 was loaded. Using this data returned by proxy functions 84A and 84B, action module 66 directs the identified printer to produce the identified document, thus, bypassing the need for user interaction.

The present invention can be embodied in any computer-readable medium for use by or in connection with an instruction execution system such as a computer/processor based system or other system that can fetch or obtain the logic from the computer-readable medium and execute the instructions contained therein. A "computer-readable medium" can be any medium that can contain, store, or maintain programming for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, a portable magnetic computer diskette such as a floppy diskette or hard drive, a random access memory (RAM), a read-only memory (ROM), an erasable programmable read-only memory, or a portable compact disc.

The present invention has been shown and described with reference to the foregoing exemplary embodiments. It is to be understood, however, that other forms, details, and embodiments may be made without departing from the spirit and scope of the invention, which is defined in the following claims.

What is claimed is:

1. A method for intercepting a call to an external function, comprising:

passing parameters to a hooking module that provides a proxy function;

the hooking module loading an action module providing an internal function that makes a call to the external function;

the hooking module identifying, in an import address table for the action module, the external function and replacing, in the import address table, an address associated with the external function with the address for the proxy function; and the hooking module making a call to the internal function resulting in the internal function making a call to the external function, wherein the act of replacing causes the call to be redirected to the proxy function which in turn returns the parameters to the internal function in a format that the internal function of the action module would expect to receive following a call to the external function.

2. The method of claim 1, further comprising the proxy function programmatically returning parameters to the action module.

3. A method for enabling an action module designed to rely on user interaction to cause the production of a document without user interaction, comprising:
   passing parameters to a hooking module that provides a proxy function, the proxy function being operable, without requiring user interaction, to return the parameters;
   the hooking module loading an action module into operational memory, the action module providing an internal function that makes a call to the common print dialog function, the common print dialog function requiring user interaction to return data needed to print a document;
   the hooking module accessing an import address table for the action module and replacing, in the import address table, an address for accessing the common print dialog function with an address for accessing the proxy function;
   the hooking module making a call to the internal function causing the internal function to make a call to the common print dialog function, the act of replacing causing the call to the common print dialog function to be redirected to the proxy function; and
   the proxy function returning the parameters to the internal function without user interaction and in a format that the internal function of the action module would expect to receive following a call to the common print dialog function.

4. Computer readable storage media, having instructions for:
   making parameters available to a proxy function;
   loading an action module providing an internal function that makes a call to the external function;
   accessing an import address table for the action module;
   identifying, in the import address table, the external function; and
   replacing, in the import address table, an address associated with the external function with an address to be used to access the proxy function;
   making a call to the internal function resulting in the internal function making a call to the external function, the instructions for replacing, once executed, causing the call to be redirected to the proxy function which in turn returns the parameters to the internal function in a format that the internal function of the action module would expect to receive following a call to the external function.

5. Computer readable storage media having instructions for:
   loading a hooking module providing a proxy function;
   making parameters available to the proxy function;
   loading an action module providing an internal function that makes a call to a common dialog function;
   identifying the address of the proxy function; and
   replacing, in an import address table for the action module, an address associated with the common dialog function with the identified address for the proxy function; and
   making a call to the internal function causing the internal function to make a call to the common dialog function, the instructions for replacing, once executed, causing the call to the common dialog function to be redirected to the proxy function which in turn returns the parameters to the internal function in a format that the internal function of the action module would expect to receive following a call to the common dialog function.

6. Computer readable storage media, having instructions for:
   loading an action module into operational memory, the action module providing an internal function that makes a call to a common print dialog function, the common print dialog function requiring user interaction to return data needed to print a document;
   loading a proxy function into operational memory, the proxy function operable, without requiring user interaction, to return data in the same format as the common print dialog function;
   making parameters available to a proxy function;
   accessing an import address table for the action module;
   replacing, in the import address table, an address for accessing the common print dialog function with an address for accessing the proxy function; and
   making a call to the internal function causing the internal function to make a call to the common print dialog function, the instructions for replacing, once executed, causing the call to the common print dialog function to be redirected to the proxy function which in turn returns, without user interaction, the parameters to the internal function in a format that the internal function of the action module would expect to receive following a call to the common print dialog function.

7. A system for intercepting a call to an external function, comprising a hooking module having a loader an import address table scanner, and an import address table reviser, the hooking module, when loaded, being operable to provide a proxy function that has access to parameters, wherein:
   the loader is operable to load an action module providing an internal function that makes a call to the external function;
   the import address table scanner is operable to identify, in an import address table for the action module, the external function;
   the import address table reviser is operable to replacing, in the import address table, an address associated with the external function with an address to be used to access a the proxy function;
   the hooking module is operable to make a call to the internal function causing the internal function to make a call to the external function that call being redirected to the proxy function; and
   the proxy function is operable to return the parameters to the internal function in response to receiving the redirected call in a format the internal function would expect to receive following a call to the external function.

8. A system for enabling an action module designed to rely on user interaction to cause the production of a document without user interaction, comprising a hooking module having a loader, an address scanner, an import address table scanner, a proxy function and an import address table reviser, wherein:
   the loader is operable to load the action module into operational memory, the action module providing an internal function that makes a call to a common print dialog function, the common print dialog function requiring user interaction to return data needed to print a document;
   the proxy function, when loaded, has access to parameters and is operable to return the parameters without user interaction and in a format the internal function would expect to receive following a call to the common print dialog function;

the address scanner is operable to identify an address for the proxy function when loaded;

the import address table scanner is operable to identify the common print dialog function within an import address table for the action module;

the import address table reviser is operable to replace, in the import address table, an address for accessing the common print dialog function with the address for the proxy function;

the hooking module is operable to wherein make a call to the internal function causing the internal function to make a call to the common print dialog function that call being redirected to the proxy function; and the proxy function is operable to return the parameters to the internal function in response to receiving the redirected call.

9. The method of claim 1, wherein passing comprises passing parameters to the hooking function wherein the parameters include one or more of data identifying a document, data identifying a printer, and data identifying production options.

10. The media of claim 6, wherein the instructions for making include instructions for making parameters available to the proxy function, wherein the parameters include one or more of data identifying a document, data identifying a printer, and data identifying production options.

11. The system of claim 8, wherein the parameters include one or more of data identifying a document, data identifying a printer, and data identifying production options.

* * * * *